United States Patent [19]
Kotzlowski

[11] Patent Number: 4,619,807
[45] Date of Patent: Oct. 28, 1986

[54] HEAT SHIELD

[75] Inventor: Heinz E. Kotzlowski, Ismaning, Fed. Rep. of Germany

[73] Assignee: Max-Planck-Gesellschaft Zur Foerderung der Wisenschaften E.V., Fed. Rep. of Germany

[21] Appl. No.: 685,603

[22] Filed: Dec. 27, 1984

Related U.S. Application Data

[63] Continuation of Ser. No. 387,946, Jun. 14, 1982, abandoned.

[30] Foreign Application Priority Data

Jul. 1, 1981 [DE] Fed. Rep. of Germany ....... 3125970

[51] Int. Cl.$^4$ .............................................. G21B 1/00
[52] U.S. Cl. .................................. 376/136; 376/146; 376/150; 376/364; 376/287; 403/11; 403/353; 285/209
[58] Field of Search ................ 376/136, 150, 146, 287, 376/289, 280, 285, 364, 440; 250/515.1, 517.1, 518.1; 403/353, 348, 197, 315, 316, 11; 285/DIG. 22, 208–210; 248/509, 510, 618, 544

[56] References Cited

U.S. PATENT DOCUMENTS

| | | | |
|---|---|---|---|
| 766,083 | 6/1903 | Watts | 285/209 |
| 1,102,079 | 6/1914 | Rizer | 403/348 |
| 2,823,932 | 2/1958 | Schigut | 285/DIG. 22 |
| 3,063,664 | 11/1962 | Vazzano | 248/544 |
| 3,679,244 | 7/1972 | Reddy | 403/353 |
| 3,764,468 | 10/1973 | Hind | 376/290 |
| 3,867,253 | 2/1975 | Gratton et al. | 376/364 |
| 3,945,883 | 3/1976 | Hind et al. | 376/280 |
| 4,003,785 | 1/1977 | Rau et al. | 376/280 |
| 4,152,206 | 5/1979 | Jabsen | 376/440 |
| 4,154,650 | 5/1979 | Prescott et al. | 376/280 |
| 4,286,152 | 8/1981 | Pugh et al. | 250/515.1 |
| 4,309,251 | 1/1982 | Anthony et al. | 376/364 |
| 4,323,428 | 4/1982 | Schallenberger et al. | 376/364 |

FOREIGN PATENT DOCUMENTS

| | | | |
|---|---|---|---|
| 2952346 | 6/1981 | Fed. Rep. of Germany . | |
| 1413971 | 9/1975 | France | 376/364 |
| 0024995 | 3/1978 | Japan | 376/136 |
| 0134197 | 11/1978 | Japan | 376/136 |
| 0020289 | 2/1979 | Japan | 376/364 |
| 0158592 | 12/1979 | Japan | 376/136 |
| 1568027 | 5/1900 | United Kingdom . | |
| 676677 | 7/1952 | United Kingdom | 403/316 |
| 838551 | 6/1960 | United Kingdom | 376/150 |
| 931972 | 7/1963 | United Kingdom . | |
| 1039588 | 8/1966 | United Kingdom . | |
| 1285248 | 8/1972 | United Kingdom . | |
| 1418495 | 12/1975 | United Kingdom | 376/364 |
| 1484315 | 9/1977 | United Kingdom . | |
| 1568585 | 4/1980 | United Kingdom . | |

OTHER PUBLICATIONS

J. of Nuclear Materials, vols 93 & 94, 1980, pp. 28–43, Cecchi.
Nuclear Fusion, vol. 21, No. 2, Feb. 1981, Cohen et al., pp. 233–249.
Conf-740402-Pl, Apr. 1974, vol. 1, pp. 356, 358, 359.

Primary Examiner—Harvey E. Behrend
Attorney, Agent, or Firm—Brumbaugh, Graves, Donohue & Raymond

[57] ABSTRACT

A heat shield for high thermal loading and particularly pulse heat loading in fusion reactors e.g. as first wall, plasma physics installations, particle accelerators, etc. contains a cooled support plate carrying a large number of shielding or limiter members on its side facing a heat source, e.g. a hot plasma. The shielding or limiter members are detachably connected to the support plate by a good thermally conducting seat, e.g. a bevel, ball or flat seat. By suitably shaping and arranging the limiter members, it is possible to substantially cover the surfaces of practically any desired shape such as, e.g., the inner wall of a toroidal vacuum vessel. As a result of their limited size, the limiter members can be adapted in a optimum manner to locally differing requirements. The size and shape of the support member can be adapted to widely differing boundary conditions.

7 Claims, 10 Drawing Figures

HEAT SHIELD

This application is a continuation of application Ser. No. 387,946, filed on June 14, 1982 now abandoned.

The present invention relates to heat protection, specifically to a heat shield system for a thermally highly loaded wall structure.

In thermonuclear reactors, plasma physics apparatus, particle accelerators and in other fields of technology heavy-duty heat shields are required, i.e. thermal screens for high-power heat sources.

PRIOR ART

It is known to use as a heat shield metal plates containing coolant ducts or which are in good thermally conductive contact with cooling conduits. The loading capacity of these known heat shields is limited, particularly if the thermal energy is applied in pulses with very high power densities. It is also difficult to produce such heat shields in complicated configurations, e.g. for toroidal vacuum vessels and the like.

Further, heat shields are known, which contain a cooled support plate having on its side facing a heat source a covering made of ceramic tiles or block-shaped bodies (DE-A-No. 29 52 346; DE-A-No. 20 29 918). Such heat shields are expensive to produce, particularly if complicated configurations are required, and in addition the ceramic tiles easily chip off. Furthermore heat shields of this type are not suitable for many purposes, e.g. vacuum systems, because they cannot easily be baked out and degassed.

THE INVENTION

It is therefore an object of the present invention to provide a heat shield for high thermal loads, which can be easily manufactured in virtually any desired configuration and which is able to withstand very high and even pulsed thermal loads.

A heat shield according to an embodiment of the invention contains relatively small shielding or limiter members, which are in good thermal contact with a cooled support plate in a manner such that they are substantially independent of their thermal loading. The shielding or limiting members are made of a material of high thermal conductivity and thermally coupled to the support plate or structure by means of a seat, e.g. a flat, bevel or ball seat, which includes a pair of mating surfaces held together by a spring member located on the cold side of the support plate. Essentially all of the heat received by a limiter element, and conducted off to the support plate; flows from the body of the limiter element through the cross-section formed by the two mating surfaces of the seat to the cooled support plate. The shielding or limiter members can be e.g., rotationally symmetrical or prismatic in shape.

The heat shield according to the invention is able to withstand extremely high, including pulsed thermal loads, being able to effectively absorb and dissipate heat, e.g., in the case of pulsed fusion reactors, the cooling periods can be considerably reduced or in the case of stationary operation the temperature of the so-called first wall of a fusion reactor can be reduced or the permitted wall loading increased.

Further advantages of the present heat shield are:

1. If the shielding or limiter members are appropriately shaped and arranged, it is possible to almost completely cover the surfaces of almost any desired shape, e.g. an inner wall surface of a toroidal vacuum vessel.

2. As a result of their limited size, the shielding members can be adapted in an optimum manner to meet locally different requirements.

3. The shielding members can be made from almost any desired material and are easily installed and/or replaced by remote control.

4. The support plates need only be connected e.g. in pointwise manner to the structure to be thermally shielded or protected, so that mechanical stresses due to temperature differences and variations in the shielded structure are avoided.

5. The sizes and shapes of the support plates, from which a predetermined heat shield structure is formed, can be easily adapted to further boundary technical conditions, such as e.g. magnetic field diffusion, electromagnetic loading, thermal storage, etc.

SHORT DESCRIPTION OF DRAWINGS

Embodiments of the invention are described hereinafter with reference to the drawings.

Figure 3:
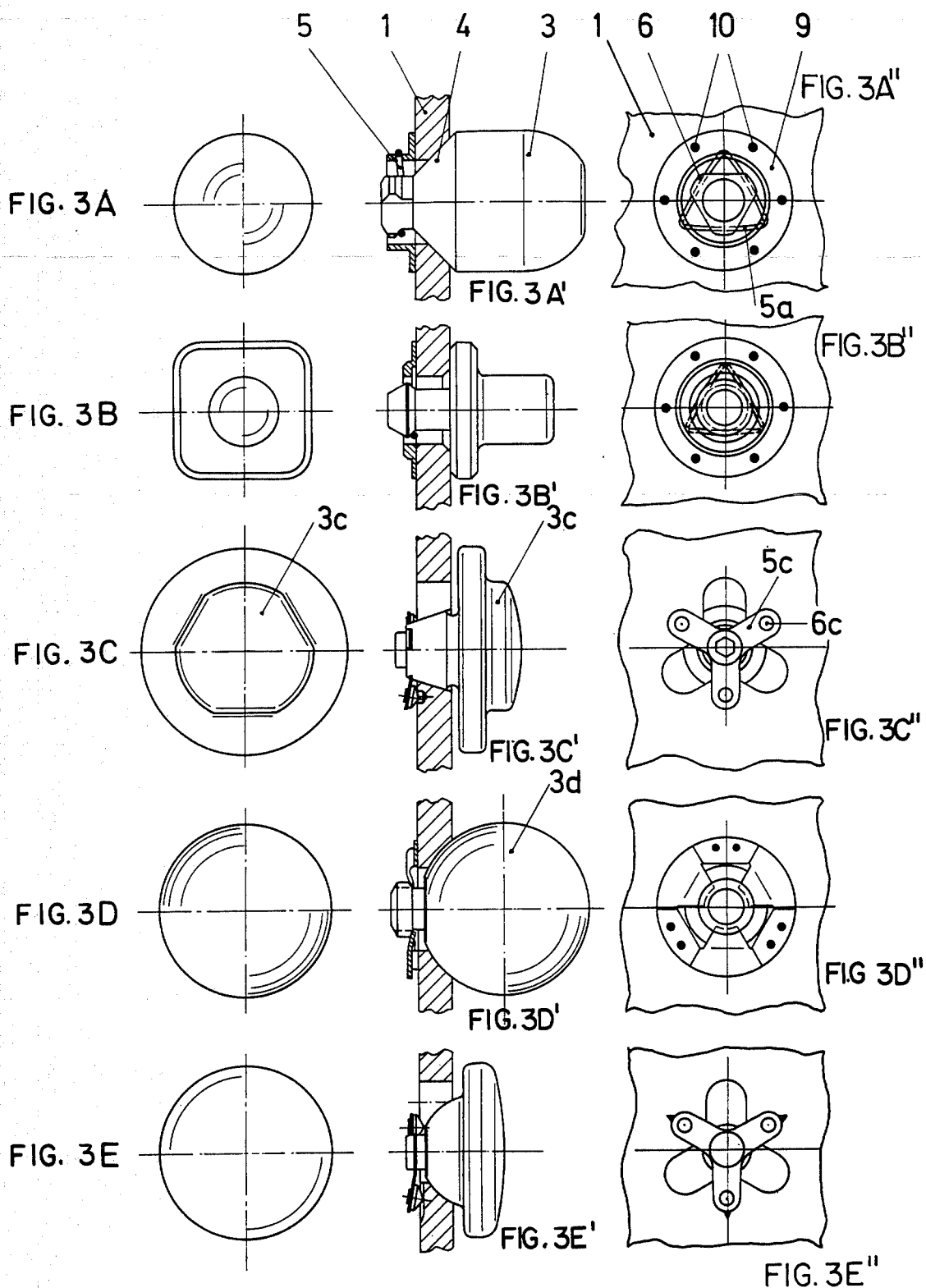

FIGS. 3A, 3E, 3A'-3E' and 3A"-3E" show different embodiments of shielding or limiter members for a heat shield according to the invention, the different embodiments being in each case shown in plan view from the side of the heat source in FIGS. 3A-3E, in side view in FIGS. 3A'-3E' and in a view from the back of the support plate in FIGS. 3A"-3E".

Figure 4:
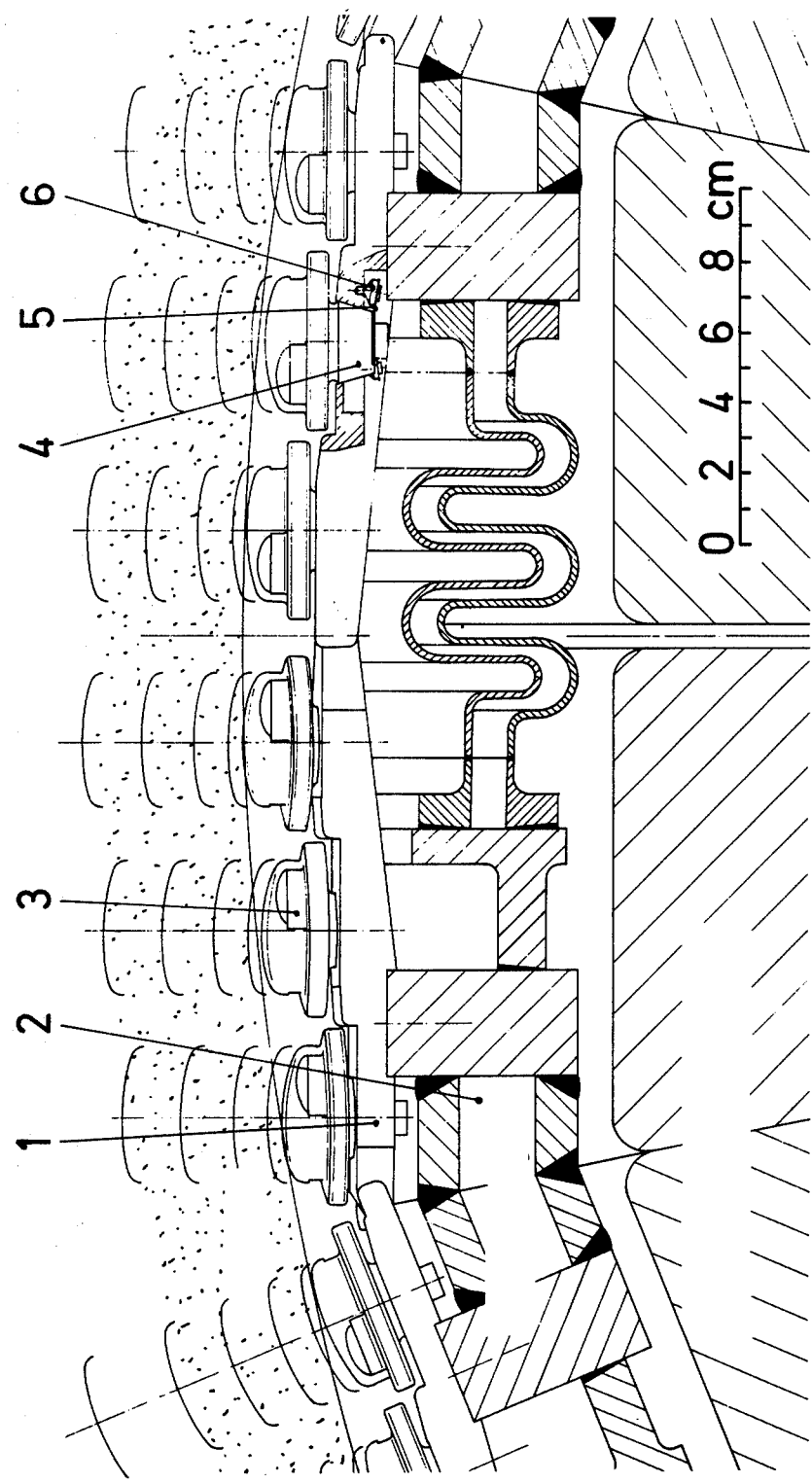

FIG. 4 is a section through the wall of a vacuum vessel of a plasma physics apparatus known under the name "ZEPHYR", provided with a heat shield according to a preferred embodiment of the invention.

Figure 1:
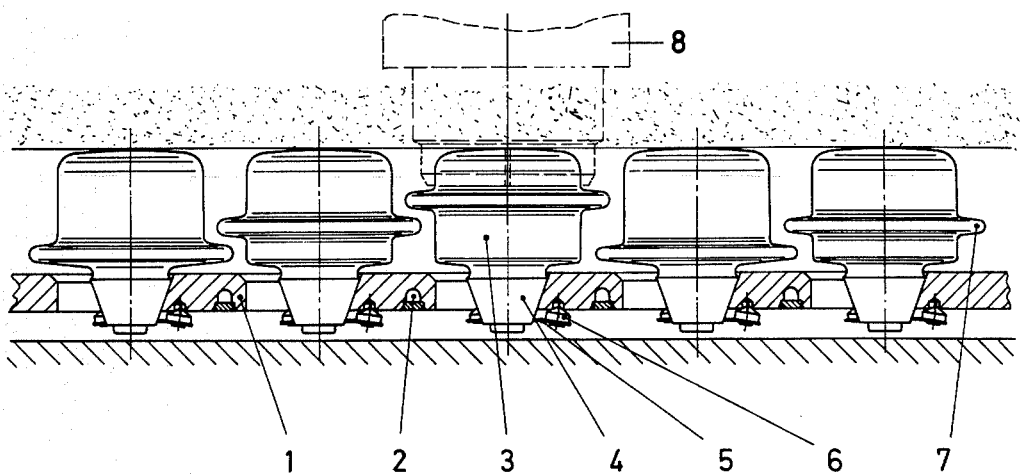
FIG. 1 is a cross-section through a heat shield according to a preferred embodiment of the invention.
Figure 2:
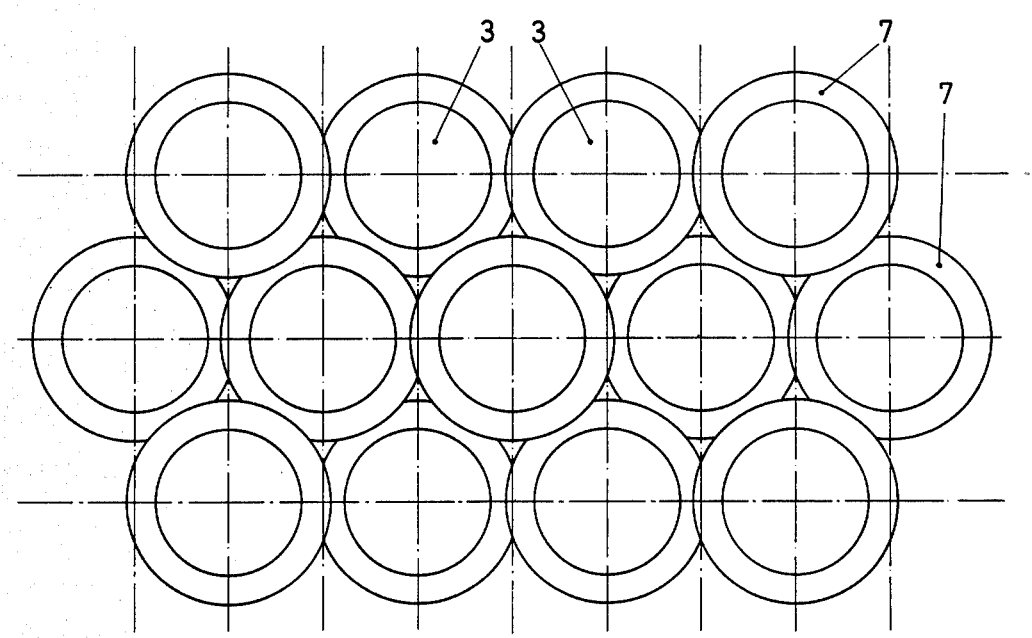
FIG. 2 is a plan view of the heat shield according to FIG. 1.

The heat shield shown in FIGS. 1 and 2 comprises a support plate 1 with cooling ducts 2 through which, in operation, a liquid or gaseous coolant circulates.

The support plate 1 is connected to each of a plurality of shielding or limiter members 3 by means of a detachable seat 4 in the form of a bevel seat in a good thermally conducting manner. The limiter members are held in their seat by a spring 5 located on the side of support plate 1 remote from the heat source (e.g. a plasma) and provided with means 6 for preventing or impeding unintensional rotation of the limiter member. This means comprises a projection on spring 5 engaging in a corresponding recess in support plate 1. The contact pressure necessary for a good thermal contact is normally above about 50 Kilopascals (kPa), e.g. 75 to 100 kPa. The heat received by the members 3 is conducted through the seat 4 to the cooled plate 1. The limiter members 3 have a rotationally symmetrical body with a covering bulge or bead 7 projecting laterally in flange-like manner. As shown in FIG. 1 between the individual limiter members the covering beads can be displaced in height in such a way that, viewed from the heat source, the beads of adjacent limiter members can mutually overlap, as shown in FIG. 2.

The limiter members can be replaced by a gripping tool 8. The replacement of the limiter members is easy and quick, since access from the side of the heat source is sufficient and no screws or similar fastening means have to be removed.

FIGS. 3A-3E show different embodiments of limiter members, seats and connections between the limiter member and the support plate. The same reference numerals as in FIG. 1 are used for corresponding or functionally indentical components.

FIG. 3A shows a limiter member with a substantially cylindrical body forming at the lower end a wide bevel seat and which is somewhat rounded at the upper end, this limiter member is fixed to the support plate by a rotation-preventing wire spring 5a, located in a spring housing 9, fixed by spot welds 10 to the support plate 1. The limiter member has a part which projects rearwards over the bevel seat 4 and which terminates in a triangular plate, which can be locked with the triangular wire spring by rotating by 60°.

FIG. 3B shows a limiter member with a cylindrical body, on whose rear end there is a square flange with rounded corners forming a flat seat with the support plate. For connection purposes a push button-like arrangement is provided, whose spring system corresponds to that of FIG. 3A and which cooperates with a pin of the limiter member which is thickened at the end.

The limiter member shown in FIG. 3C is shaped like a circular disk with a three-faced gripping shoulder 3c projecting therefrom. As in the case of the embodiment of FIG. 1 the seat by which the limiter member is in good thermally conducting, but detachable connection with the support plate is a bevel seat. The spring system and rotation preventing means also correspond to those of FIG. 1. Spring 5 is a three-armed leaf spring, at whose ends are provided burls or projections, 6c, formed by dimples and which engage in associated depressions on the support plate not shown.

FIG. 3D shows a spherical limiter member with a ball seat and a leaf spring/thread locking device.

FIG. 3E shows a flat, cylindrical limiter member with ball seat and three armed leaf spring, as in FIG. 3C.

FIG. 4 shows a section through the wall of a vacuum container of a ZEPHYR thermonuclear research reactor, provided with a heat shield according to an embodiment of the invention. The heat shield contains limiter members, as shown in FIG. 3C. As shown in FIG. 4, the support plates 1 need not be flat and can in fact be adapted to the configuration of the container wall and can be for example be stepped.

According to the embodiment of FIG. 1 the limiter members are made from graphite and SiC, the bevel seat having a bevel angle of 40°.

The support plates 1 are generally made from metal, e.g. steel 1.4311, Al or Al-alloys. As a function of their use, the limiter members can be made from different materials, e.g. metals such as W, Mo, Nb, V, Cu and austenitic chrome-nickel steels. Apart from the aforementioned materials, graphite and SiC, in the case of higher loading it is also possible to use TiC, $TiB_2$, $B_4C$ or metals coated with such thermally heavy-duty, refractory materials.

High temperature-resistant steels (e.g. Duratherm 600 supplied by Vacuumschmelze) are suitable for the spring members. As the spring members are located on the cold side of the support plate, they are protected from direct thermal action. The temperature of the support plates does not generally exceed 200° C., so that the spring members, which are in good thermal contact with the associated support plate are adequately cooled by the latter.

The thermal contact between the spring and the limiter member is preferably kept low by a point-like, small-area contact. The heating of the springs by radiation can be kept small by producing the springs from wire material, which offers the radiation a relatively small surface area. If the heating of the springs is not critical, they can be directly fixed to the limiter members (FIGS. 3C and E). In the case of possible fatigue or damage they can then be replaced more easily and rapidly than when fixed to the support plates.

A preferred diameter of the limiter elements shown in FIGS. 1 to 4 is in the order of 5 centimeters, preferred materials are copper and aluminum. The preferred seat contact force is in the range from about 50 to about 100 Newtons, the preferred contact pressure range being about 75 to about 100 kilopascals.

It will be appreciated that various modifications and changes can be made in the embodiments disclosed by those skilled in the art without departing from the essence of the invention and that the invention is to be limited only within the scope of the appended claims.

We claim:

1. In a nuclear fusion reaction system having a vessel, said vessel containing a hot plasma, the improvement comprising a heat shield structure for shielding the inner surface of the walls of said vessel from the hot plasma, said heat shield structure comprising:

a support plate having a first side facing the inner surface of said vessel walls and a second side facing away from the inner surface of said vessel walls, said support plate having a plurality of holes extending from said first to said second side, each of said holes being provided with a substantially annular seat facing said first side, said support plate provided with conduit means for conducting a coolant for removing heat from said support plate;

and a plurality of heat shield members, each made of thermally conductive material, said members being arranged to detachably mount to said holes in said support plate, each of said members having a body portion arranged when mounted to project from said first side of said support plate and to shield said vessel from the hot plasma, and each of said members having a support portion for thermally conductively engaging said seat on said support plate, said support portion including a substantially annular surface arranged to mate with said seat and including spring means interconnecting said support portion with said second side of said support plate and applying force on said member to pull said support portion of said member into said hole and press said annular surface against said seat.

2. A heat shield structure according to claim 1 wherein the spring means is attached to the support portion of said member and has laterally extending portions, and wherein the holes in the support plate have laterally extending cutouts of a shape similar to the laterally extending spring portions; the spring means thereby allowing the corresponding member to be connected to and disconnected from said support plate by rotating the member with respect to said plate.

3. A heat shield structure according to claim 1 wherein said seat surfaces are flat annular surfaces.

4. A heat shield structure according to claim 1 wherein said seat surfaces are conical surfaces.

5. A heat shield structure according to claim 1 wherein said seat surfaces are spherical surfaces that form a ball seat.

6. A heat shield structure according to claim 1 wherein each body portion has a flange-like lateral projection.

7. A heat shield structure according to claim 6 wherein said flange-like lateral projections of adjacent heat shield members are located at different spacings from the adjacent surface of the support plate and partly overlap.

* * * * *